United States Patent [19]

Elser

[11] 4,421,011
[45] Dec. 20, 1983

[54] POWER STEERING SYSTEM FOR MOTOR VEHICLES

[75] Inventor: Dieter Elser, Essingen, Fed. Rep. of Germany

[73] Assignee: Zahnradfabrik Friedrichshafen, A.G., Friedrichshafen, Fed. Rep. of Germany

[21] Appl. No.: 299,325

[22] Filed: Sep. 4, 1981

[30] Foreign Application Priority Data

Sep. 19, 1980 [DE] Fed. Rep. of Germany ....... 3035407

[51] Int. Cl.³ .............................................. F15B 9/10
[52] U.S. Cl. ........................................ 91/380; 91/382
[58] Field of Search ................. 91/373, 380, 382, 368, 91/385

[56] References Cited

U.S. PATENT DOCUMENTS

| 1,467,209 | 9/1923 | Sumner | 91/382 X |
| 2,930,357 | 3/1960 | Brueder | 91/382 X |
| 2,935,883 | 5/1960 | Browning | 91/380 X |
| 2,941,514 | 6/1960 | Jablonsky | 91/380 X |
| 3,010,335 | 11/1961 | Foerster et al. | 74/388 |
| 4,010,815 | 3/1977 | Strauff | 91/373 X |
| 4,022,109 | 5/1977 | Donner | 91/356 |

Primary Examiner—Robert E. Garrett
Assistant Examiner—Abram McConnell Bradley, IV
Attorney, Agent, or Firm—Zalkind & Shuster

[57] ABSTRACT

A power steering system has a servomotor flow control valve with means for automatically returning the vehicle to straight ahead position by hydraulic power. This is accomplished in a construction utilizing a piston valve linked by a cam mechanism to movement of a servomotor piston in such manner that, responsive to movement of the servomotor piston, and upon return of the piston valve to a neutral position a brief overtravel beyond neutral position occurs which reversely pressurizes the servomotor to straighten the wheel direction after a turn.

11 Claims, 6 Drawing Figures

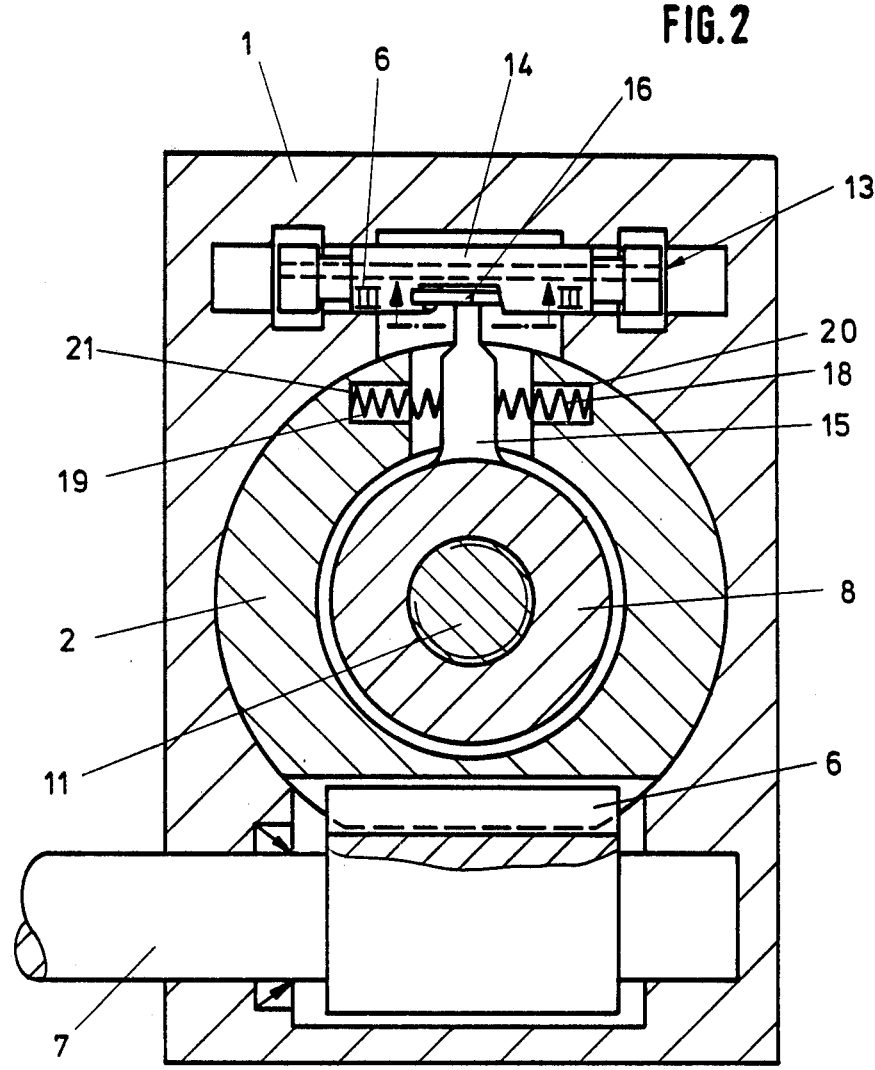
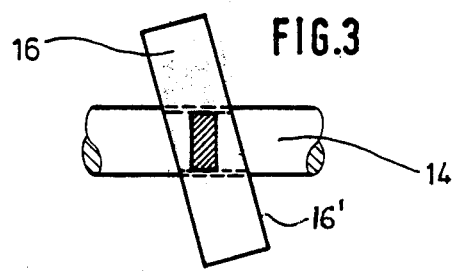

POWER STEERING SYSTEM FOR MOTOR VEHICLES

This application is related to my previously filed application, Ser. No. 283,470 and Ser. No. 283,456, both filed July 15, 1981.

BACKGROUND

Power steering systems of the kind described herein are shown in German patent publications DE-AS No. 12 81 872 and DE-OS No. 19 40 490. In such systems, piston valves are used synchronized with a servomotor piston wherein a steering nut carried by the servomotor piston has a guide element elongated parallel to axis of the nut and servomotor piston engaged in a groove of the piston valve so that rotation of the nut by means of a steering spindle initially actuates the piston valve in a selected direction for pressurizing one chamber or the other of a servomotor. As the piston moves, the nut moves axially with it and the guide element rides in the groove of the piston valve in an axial longitudinal direction. The effect is to synchronize the steering angle of the nut in relation to the housing which contains the servomotor piston, steering system, etc., so as to ensure the actuated position of the piston valve with the nut moving.

In such constructions, moving in straight line, there is no independent shifting effect of the guide element acting on the piston valve since the moving path of the guide element is parallel to the axis of the nut and the servomotor piston.

Centering of the valve piston and nut is effected by springs at the ends of the valve piston, for example, as shown in DE OS No. 18 17 940; German publication DE OS No. 18 17 940.

In the prior art, it has been customary to provide means for returning the vehicle wheels to a straight ahead position after steering by means of axial geometry, e.g., toe-in, and other mechanical arrangements. However, there is a disadvantage in such mechanical arrangements, in that the wheel restoring force must be supplied as energy to the restoring mechanism and, accordingly, higher steering forces are required.

THE PRESENT INVENTION

In the prior art as described above the guide element and groove arrangement between the nut and the piston valve is not under control of a cam means operative to effect a reverse movement of the piston valve toward neutral position while the servomotor piston is travelling in a direction for a selected steering direction. In this invention, using cam means with return spring means, a certain brief overtravel past neutral position of the piston valve occurs when manual steering force is released from the steering wheel. Such overtravel results in reverse pressurizing of the servomotor to bring the vehicle wheels back from a steered position to a straight ahead position. The restoring force is automatically by hydraulic power.

More specifically, the extent of reverse movement of the piston valve depends upon the steering angle of the vehicle wheels, i.e., the extent to which the servomotor piston has moved.

In effect, when the piston valve has been shifted in a selected direction, the servomotor piston is powered in a particular direction for a selected steering direction, the piston valve is automatically shifted by movement of the servomotor piston in a direction opposite to the selected direction in a return shift towards neutral position.

In one modification of the invention, compression springs are stressed for nut and piston valve neutral return centering means and in another modification a leaf spring is stressed for that purpose. In the first mentioned modification the nut carries a cam member slidable in a coacting groove of the piston valve and in the latter modification the nut carries the leaf spring which has a cam member slidable in a cam groove of the housing.

In either case, the return spring means is held in stress during steering and when it is desired to discontinue the steering, release of manual force on the steering wheel causes the return means to return the nut and piston valve to a center neutral position. Since the cam means has already reversed the piston valve toward neutral position the release of the spring return means moves the piston valve briefly beyond neutral position and thereby reverses the pressurizing of the servomotor to straighten the vehicle wheels by hydraulic power.

The invention provides the advantage of not only eliminating the need for a mechanical restoring force, but also makes it possible to design steering mechanisms of smaller dimensions than heretofore used for heavy vehicles, wherein no restoring force need be initially provided in the design of such mechanism. Also, the invention has the advantage that in certain instances dual circuit steering systems, otherwise necessary for heavy vehicles, can be eliminated.

A further advantage is that the cam means can be designed for any desired centering or return characteristics in that the spring means does not act initially on the piston valve, but on the nut which carries a cam member either shaped as a cam or as a follower operating in a cam shaped or non-axial groove of the housing. In either case, the reverse return movement of the valve piston is a function of the shape of a cam member carried by the nut or a function of the shape of a cam groove in the housing. Thus, either shape of cam or groove cam control pressure flow to the servomotor in a predetermined manner to straighten the vehicle wheels as well as to center the servomotor piston between the pressure chambers of a servomotor cylinder.

A detailed description of the invention now follows in conjunction with the appended drawings in which:

FIG. 2 is a radial section on the line II—II of FIG. 3; showing compression springs as a return means;

FIG. 3 shows fragmentarily the relationship of a cam member in a groove of a piston valve;

Inasmuch as the general organization and components of the steering systems of the kind improved by this invention are well known only brief references to conventional components need be made.

Figure 1:
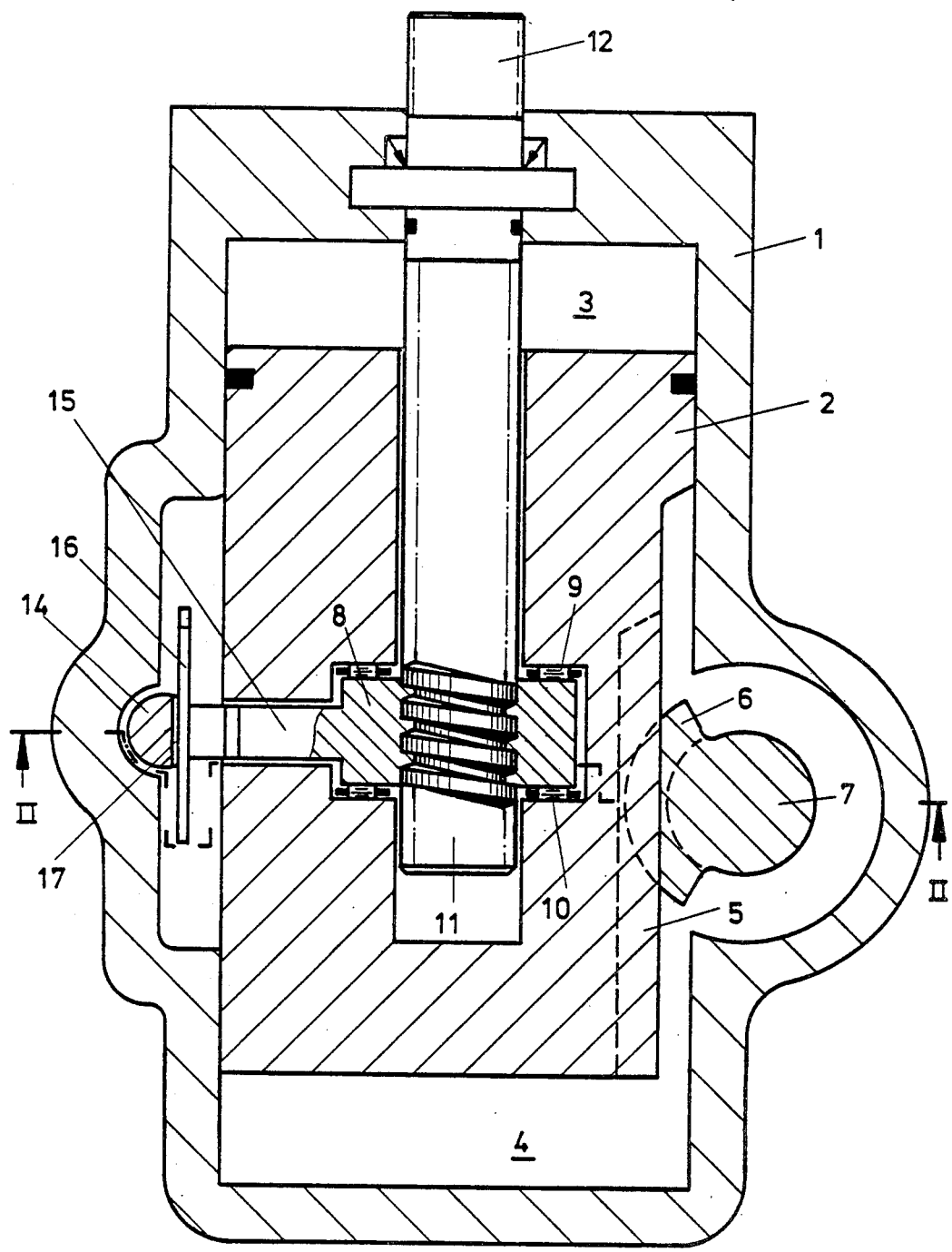
FIG. 1 is a longitudinal section through a steering system housing showing essential components.

Referring to FIGS. 1-3, a steering housing 1 of the power steering system is constructed to effect a servomotor having a servomotor piston 2 and pressure chambers 3 and 4. The piston has a gear rack 5 meshing with the teeth 6 of a gear sector fo the output steering shaft which operates a steering mechanism (not shown).

Within piston 2 and rotative relative thereto, but axially movable therewith, is a steering nut 8 carried on worm shaft 11, which nut may be of the usual low friction ball nut type. However, a conventional trapezoidal thread may also be used. The steering nut 8, hereinafter for convenience generally referred to in this specification as a nut, has the usual screw coaction with a worm shaft 11.

Worm shaft 11 connects with steering spindle 12 which will be understood to be rotatable by manual force via a steering wheel (not shown).

A flow control valve 13 having a reciprocally shiftable piston 14 carried in the housing pressurizes or exhausts, alternatively, the pressure chambers 3 and 4 of the servomotor within housing 1, all in accordance with hydraulic circuitry well known and not illustrated.

Nut 8 carries radially and integrally thereon a lever arm 15 at the end of which is integrally carried a platelike cam member 16 which in conjunction with a cam groove 17 in the side of the piston valve 14 effects a cam means such that the edges of cam member 16 and the edges or sides of cam groove 17 are oriented at an angle to the axis of and the axial direction of movement of the servomotor piston.

FIG. 3 illustrates the inclined position of cam member 16 and groove 17 with respect to piston valve 14. The cam edges 16' can take in order to predetermine various actuating characteristics of return movement of the valve piston as effected by the cam means.

In particular, it will be noted that the angle of the edges 16' of cam member 16, or any shape of cam edges which may be provided, is such that if the selected direction of actuation of piston valve 14 is, say, to the right to move piston 2 along with nut 8 away from the viewer as seen in FIG. 2, the action of the cam means effected by the axial movement of nut 8 with piston 2 will be in the opposite direction to the selected direction, i.e., to the left, i.e., moving the piston valve reversely towards neutral.

Of course, the opposite effect, directionally, likewise takes place should the selected direction of the piston valve being such as to pressurize the piston to move into the page as viewed on FIG. 2.

The valve piston 14, as will be noted, is operated by cam means only when the piston 2 is moving. Pressure control by the piston valve is initiated by hand wheel rotation of steering spindle 12 causing rotation of nut 8 and swinging of arm 15 to compress either spring 18 or 19. Thus, the piston valve shifting is by direct thrust of cam member 16 with no camming action and the springs serve as nut and piston valve return means to hydraulic center and neutral position.

Springs 18 and 19 are compression springs which press on opposite respective sides of arm 15 and are carried in bores, respectively, 20 and 21 in the sides of an opening 2' of the servomotor piston 2 through which arm 15 protrudes.

OPERATION

Initial rotation of hand force operated steering spindle 12 causes rotation of nut 8 since the ball nut is carried by the piston 2 and initially the piston cannot move due to the effect of road resistance acting against the vehicle wheels. Such effect is conventional for initial valve actuation in order to commence hydraulic boost, i.e., the nut is initially locked via the threaded connection to worm shaft 11.

Rotation of nut 8 swings the arm 15 which is integral with the nut to compress either the spring 18 or 19 depending on direction of rotation. Inasmuch as the nut 8 is not axially moving at this type, because piston 2 is not yet axially moving, there is no camming action effected by cam member 16 which has only pure arcuate motion with a direct thrust in a selective direction to actuate the piston valve 14 for pressure flow to a respective chamber 3 or 4 of the servomotor while exhausting the other chamber.

The pressurized piston 2 carries the nut 8 along with it, together with the integral cam 16 which has pure translating movement at this time. Cam means actuation now occurs to actuate the piston valve 14 by operation of an edge 16' of cam member 16 in cam groove 17. This actuation is opposite to the selected direction of valve 14 effected by manual force on spindle 12 due to the direction of slant of the edges 16' of cam 16. Either of the edges 16' is operative depending on the direction of movement of piston 2.

At this time, arm 15 is still being held by manual force on the steering spindle in actuated position, spring 18 or 19 is under compression, the vehicle wheels are being steered or are at a steered angle.

Now, when manual force on the steering spindle 12 is released, valve 14 has already moved back to some extent towards neutral position due to the cam means. The extent to which this reverse movement of the valve takes place depends on how much the vehicle wheels has been turned, e.g., 20°, 30°, etc.

However, the extent of compression of spring 18 or 19 is a fixed amount being designed sufficient to open the piston valve 14 for flow. Accordingly, upon release of manual force on the steering spindle, spring 18 or 19 returns the valve 14 to neutral position, but causing a brief overtravel in so doing, and to an extent proportioned to the amount of distance the piston valve 14 has already traversed in the return movement effected by the cam means. This is proportional to the angle the vehicle wheels have been turned in a steering operation which angle governs the extent to which the cam means has been actuated. Thus, the pressure-exhaust flow to the servomotor is reversed and the vehicle wheels are reversely steered through an angle equal to the original steering angle in returning to a straight ahead position under hydraulic power.

More specifically during a steering movement, one cylinder chamber is pressurized. When manual force on the steering wheel is released at the end of the steering movement, the nut 8 and arm 15 are then centered by springs 18 and 19. At that time, piston 2 is not in centered i.e., neutral position, and likewise the midpoint of cam 16 is not centered on the axis of valve 14, the cam having moved vertically during the steering movement relative to the view of FIG. 3.

Accordingly, valve 14 has moved left or right relative to FIG. 2, from the centered neutral position to pressurize the other cylinder chamber whence piston 2 moves in a return direction to center position, viz, straight ahead steering position. Thus, the position of valve 14 always corresponds to the position of piston 2.

Figure 4:
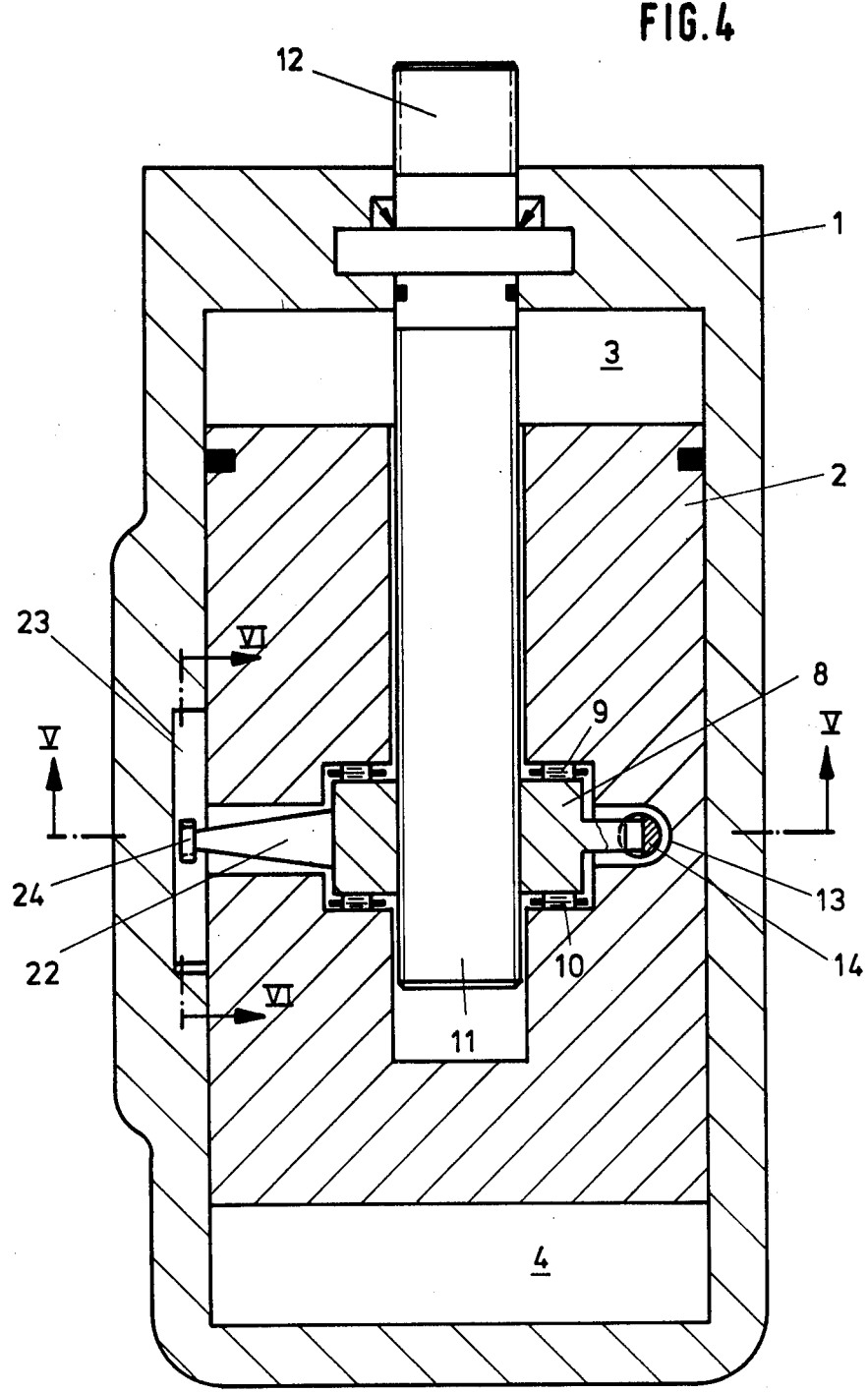
FIG. 4 is a longitudinal section of a modification using a leaf spring return means, the section being taken on the line IV—IV of FIG. 5.
Figure 5:
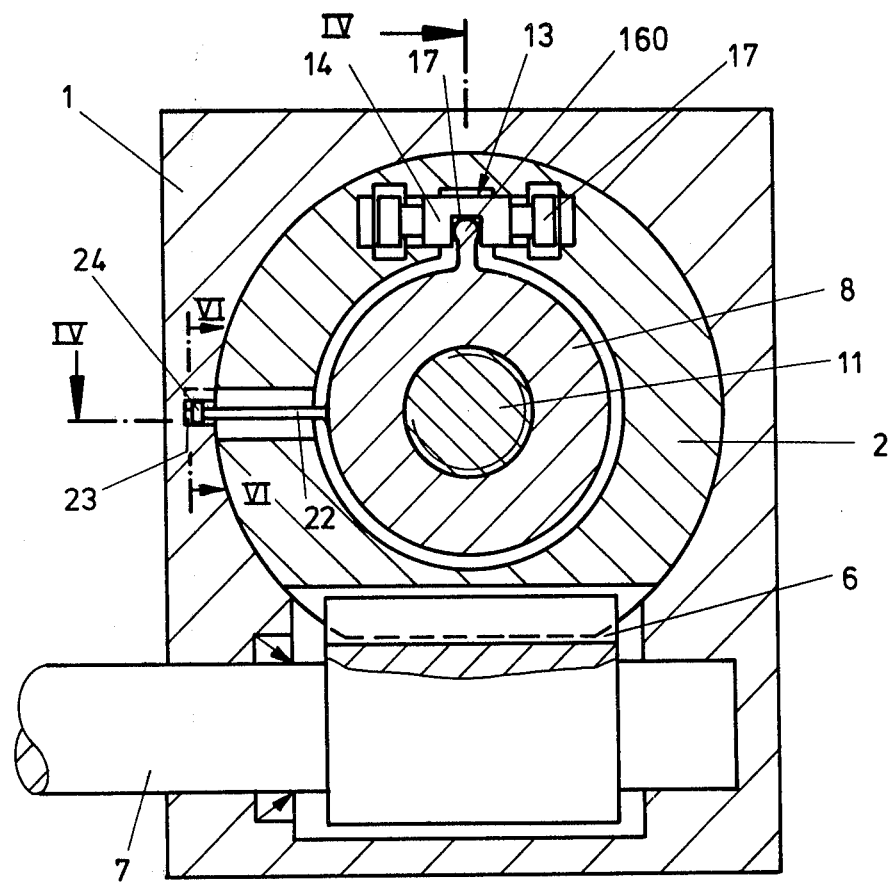
FIG. 5 is a radial section on the line V—V of FIG. 4.
Figure 6:
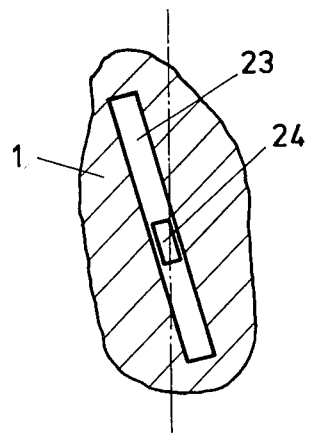
FIG. 6 illustrates fragmentarily the relationship of the cam member in a housing groove.

In the embodiment shown in FIGS. 4–6, wherein like reference characters identify like parts as described on FIGS. 1–3, the basic principle as explained above is carried out in a construction wherein a leaf spring 22, flexible in either direction, is carried by the nut 8 as a return means for centering the ball nut and valve piston and coacting with cam means for the same purpose of using hydraulic power for straightening the vehicle wheels after a turn.

In this instance, the nut 8 carries a finger 160 operative in the groove 17 of valve piston 14. Finger 160 moves axially with the nut and the servomotor piston 2, and serves only to shift the piston valve 14 directly in either direction for pressurizing the servomotor initially or responsive to a cam means.

Camming action is provided by a cam groove 23 cut into the housing wall and having slidable therein a cam member 24, a cam follower, carried at the extremity of the flexible leaf spring 22 which extends through a radial opening in the piston 2, FIG. 5.

The angle of orientation of cam groove 23, shown as straight sided in FIG. 6, relative to the axis of the servomotor piston and of the nut is such that upon movement of the ball nut with the piston, the cam member 24 riding in the cam groove 23 is actuated to rotate the nut in such direction that the finger 160 reverses the selected direction of the piston valve as initially effected for steering, all as occurs with different means in the previously described embodiment. However, in the embodiment of FIGS. 4–6, there could be a shaped, e.g., curved sided groove, wherein cam member 24 is given predetermined actuated movement of some desired characteristic.

Regardless of design of the cam means, the cam controlled operation of the nut is operative to actuate finger 160 for the purposes described.

In operation, rotation of spindle 12 by a hand steering wheel causing rotation of nut 8 flexes leaf spring 22 in one direction or the other and finger 160 opens piston valve 14 to pressurize the servomotor chamber 3 or 4 while exhausting the other by hydraulic circuitry which is well known. Accordingly, nut 8 moves axially with the piston under power and cam member 24 following cam groove 23 rotates the nut to shift the piston valve toward neutral, spring 23 remaining flexed. Upon release of manual force from steering spindle 12, spring 22 resumes its straight position rotating the nut back to center it while finger 160 moves the piston valve with brief overtravel to neutral position. As a result the servomotor is pressurized in the opposite direction to straighten the vehicle wheels.

I claim:

1. In a power steering system comprising within a housing, a servomotor having a piston (2) with a worm shaft (11) rotative by a steering wheel extending thereinto and a steering nut (8) rotative on said worm shaft within said piston and having axial movement therewith including a flow control valve (14) for pressure and exhaust flow control of said servomotor and actuatable in a selected direction by actuating means (16) (160) engaged with said control valve and carried by and rotative with said steering nut;
   further including valve return means (18, 19, 22) for return of said flow control valve to a neutral position connected to be stressed upon initial rotation of said steering nut by steering rotation of said worm shaft in actuating said valve and being operative to effect return of said steering nut to a centered position upon release of steering force on said steering wheel whereat said valve is in a neutral position;
   the improvement wherein:
   said actuating means comprises elements (16-16', 17) (23, 24) operatively connected to said steering nut and to said flow control valve and coacting responsive to axial movement of said steering nut by said servomotor piston to actuate said flow control valve in a direction to reverse the pressurizing of said servomotor by actuating said flow control valve in a direction opposite to the selected direction to straighten the wheels of a vehicle after a turn upon release of the steering wheel and said actuating means being operatively connected to said valve return means for return to neutral position.

2. In a power steering system as set forth in claim 1, wherein said elements comprise a cam device having coacting cam members (16—16',17) (23,24) one of which is carried by said steering nut and said cam members coacting in a path at an angle to the axial movement of said steering nut.

3. In a power steering system as set forth in claim 1, wherein said actuating means comprises a cam device having a first cam member (16—16') (24) carried by said steering nut, and having a second cam member (17) (23) coacting with said first cam member, wherein rotative movement of said worm shaft initially rotates said steering nut to operate said flow control valve in one direction to pressurize said servomotor and wherein axial movement of said servomotor piston axially moves said steering nut whereby said cam members in coaction with said valve return means operate said flow control valve in an opposite direction effecting an overtravel of said flow control valve past neutral position upon release of steering force on said steering wheel in returning said flow control valve to neutral position to reversely pressurize said piston.

4. In a power steering system as set forth in claim 1, said actuating means comprising a cam device having
   a cam member (16—16') carried by said steering nut and having opposed cam edges;
   said flow control valve having cam means (17) coacting with respective edges of said cam member;
   said cam edges being at an angle to the axial movement of said steering nut and oriented to actuate the flow control valve in a direction opposite to said selected actuation direction upon axial movement of said steering nut.

5. In a power steering system as set forth in claim 4, an arm (15) carried by said steering nut and said cam member (16—16') being carried by said arm;
   said valve return means comprising springs acting on said arm in opposite directions stressed by initial rotation of said steering nut in a selected direction.

6. In a power steering system as set forth in claim 5, said springs being opposed springs, there being a spring on each side of said arm and exerting thrust thereagainst in opposite directions.

7. In a power steering system as set forth in claim 6, said servomotor piston having an opening therethrough;
   said arm extending through said opening;
   said opening having opposed sides;
   said sides of said opening having bores (20, 21) to receive respective springs.

8. In a power steering system as set forth in claim 1, said actuating means comprising a cam device having a cam member (24);

said valve return means comprising a spring (22) carried by said steering nut and carrying said cam member;

said housing having cam edge means (23) providing cam edges respectively engaged by said cam member for bidirectional valve movement;

said cam edges being longitudinally oriented relative to the axial movement of said steering nut whereby said axial movement of said steering nut effects rotation thereof; and a member (160) carried by said steering nut engaging said flow control valve for movement thereof in a direction opposite to said selected direction.

9. In a power steering system as set forth in claim 8, said spring being a leaf spring flexible in opposite directions and extending radially from said steering nut;

said cam member being carried by said leaf spring.

10. In a power steering system as set forth in claim 9, said servomotor piston having an opening and said spring extending therethrough.

11. In a power steering system as set forth in claim 10, said cam edges being a groove of said housing and said cam member being slidable within said groove.

* * * * *